United States Patent [19]
Manning et al.

[11] 3,885,926
[45] May 27, 1975

[54] MODIFIED CALCIUM CHLORIDE BRINE DESICCANT

[75] Inventors: Francis S. Manning; Paul Buthod; Robert A. Hodgson; Ibrahim Bagci, all of Tulsa, Okla.

[73] Assignee: Maloney-Crawford Tank Corporation, Tulsa, Okla.

[22] Filed: June 26, 1974

[21] Appl. No.: 483,211

[52] U.S. Cl.................................. 55/29; 252/194
[51] Int. Cl....................... B01d 53/02; B01d 53/14
[58] Field of Search....................... 55/29, 35, 388

[56] References Cited
UNITED STATES PATENTS

| | | | |
|---|---|---|---|
| 1,203,941 | 11/1916 | VanCalcar et al. | 55/35 |
| 1,866,560 | 7/1932 | Gordon et al. | 55/29 |

*Primary Examiner*—Charles N. Hart
*Assistant Examiner*—Ethel R. Cross

[57] ABSTRACT

A new composition of matter comprising 100 parts of 50 weight percent calcium chloride and 15 parts magnesium nitrate, and a process for using the new composition of matter for dehydrating gaseous petroleum hydrocarbons.

1 Claim, No Drawings

MODIFIED CALCIUM CHLORIDE BRINE DESICCANT

BACKGROUND OF THE INVENTION

This invention lies in the field of gas drying apparatus and procedures. More particularly, it concerns a special composition of matter which has been found particularly advantageous for use in the drying of gaseous petroleum hydrocarbons.

In a natural gas dehydration apparatus using a liquid desiccant the water vapor content of the gas leaving the dehydrator is a function of the difference between the water vapor pressure in the gas and the water vapor pressure in the liquid dessicant. In a natural gas dehydrator using calcium chloride brine as the liquid desiccant the greater the concentration of salt in the brine used, the lower the water vapor pressure of the brine, and the more water vapor that can be removed from the gas, and as a result, the lower the dew point of the gas.

The concentrated brines however, have a tendency to crystalize and solidify as their concentration increases and their temperature decreases, unless the brine can be maintained at a temperature above its crystalization temperature it will solidify in the piping to and from the injection pump, and cannot be pumped into the contact tower.

As an example, a 35 weight percent of calcium chloride brine being used in a gas dehydrator will achieve an equilibrium dew point depression of 22° F at a gas pressure of 1,000 psi and a temperature of 100° F, and it will solidify at temperatures below 12° F. A 50 weight percent of calcium chloride brine will achieve an equilibrium dew point depression of 48° F, at the same conditions, but will solidify at temperatures below 85° F. It is therefore apparent from the foregoing that to achieve the greatest dew point depression in the dehydration of natural gas a liquid desiccant must be of the highest concentration possible, while not solidifying at the lowest ambient temperatures encountered.

While it has been customary in the prior art in the use of calcium chloride dehydrators, to use a mixture of chemical salts with the calcium chloride, none of these compositions have expressly been as useful in lowering dew point and preventing the solidification of the calcium chloride, as has the particular composition of this invention.

SUMMARY OF THE INVENTION

It is a primary object of this invention to provide a composition of matter which, when used as a concentrated brine solution, will have the greatest dew point depression of the processed gas, and will also provide a lower temperature point of solidification of the brine than previously used brine mixtures.

This and other objects are realized and the limitations of the prior art are overcome in this invention by using a mixture of calcium chloride and magnesium nitrate. This mixture in the proper ratio not only provides a greater dew point depression, but it also permits a lower operating temperature without causing the brine to crystalize and solidify.

DESCRIPTION OF THE PREFERRED EMBODIMENT

It has been found that a brine composed of 100 parts by weight of 50 weight percent calcium chloride solution, and 15 parts by weight of magnesium nitrate will provide the desired results.

The present invention concerns a liquid desiccant composed of a mixture of salts which can contain a higher percent of calcium chloride, and will solidify at a lower temperature, than will a straight calcium chloride brine at a concentration that can be pumped under all expected operating temperatures.

It has been discovered by laboratory tests that a 50 weight percent solution of calcium chloride can be kept in a pumpable slurry condition down to 32° F, by the addition of 15 parts by weight of magnesium nitrate per 100 parts by weight of 50 weight percent of calcium chloride solution. This is equivalent to approximately 56 weight percent of combined salts in the solution. Field tests on this material show a dew point depression of 54° F can be achieved.

The magnesium nitrate not only prevents solidification of the brine but also helps to lower the solution vapor pressure even farther than that of calcium chloride alone, giving a better dew point depression than straight 50 weight percent calcium chloride.

Other combinations are possible using calcium chloride as the base brine solution with the addition of magnesium and/or lithium and/or ammonium salts.

Field operating results show that a 35 weight percent calcium chloride brine at 100° F with the addition of magnesium nitrate will cause a dew point depression of 28° F as compared to 22° F for the brine alone. Also, a 50 weight percent calcium chloride brine with 15 parts per hundred parts magnesium nitrate at 100° F will give an equilibrium dew point depression of 55.5° F, as compared to 46.5° F for the brine alone. This difference in dew point depression holds over the range of up to 3,000 psi contractor pressure.

The physical apparatus in which this new brine composition can be used forms no part of this invention. Any suitable commercial apparatus can be used, such as the apparatus described for example, in U.S. Pat. Nos. 2,804,935; 2,804,940; 2,804,941, and others.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by scope of the attached claim or claims, including the full range of equivalency to which each element or step thereof is entitled.

What is claimed:

1. The method of dehydrating gaseous petroleum hydrocarbons by passing them through a solution of 100 parts of 50 weight percent calcium chloride plus 15 parts magnesium nitrate.

\* \* \* \* \*